Aug. 8, 1939     E. BENTZ ET AL     2,168,949

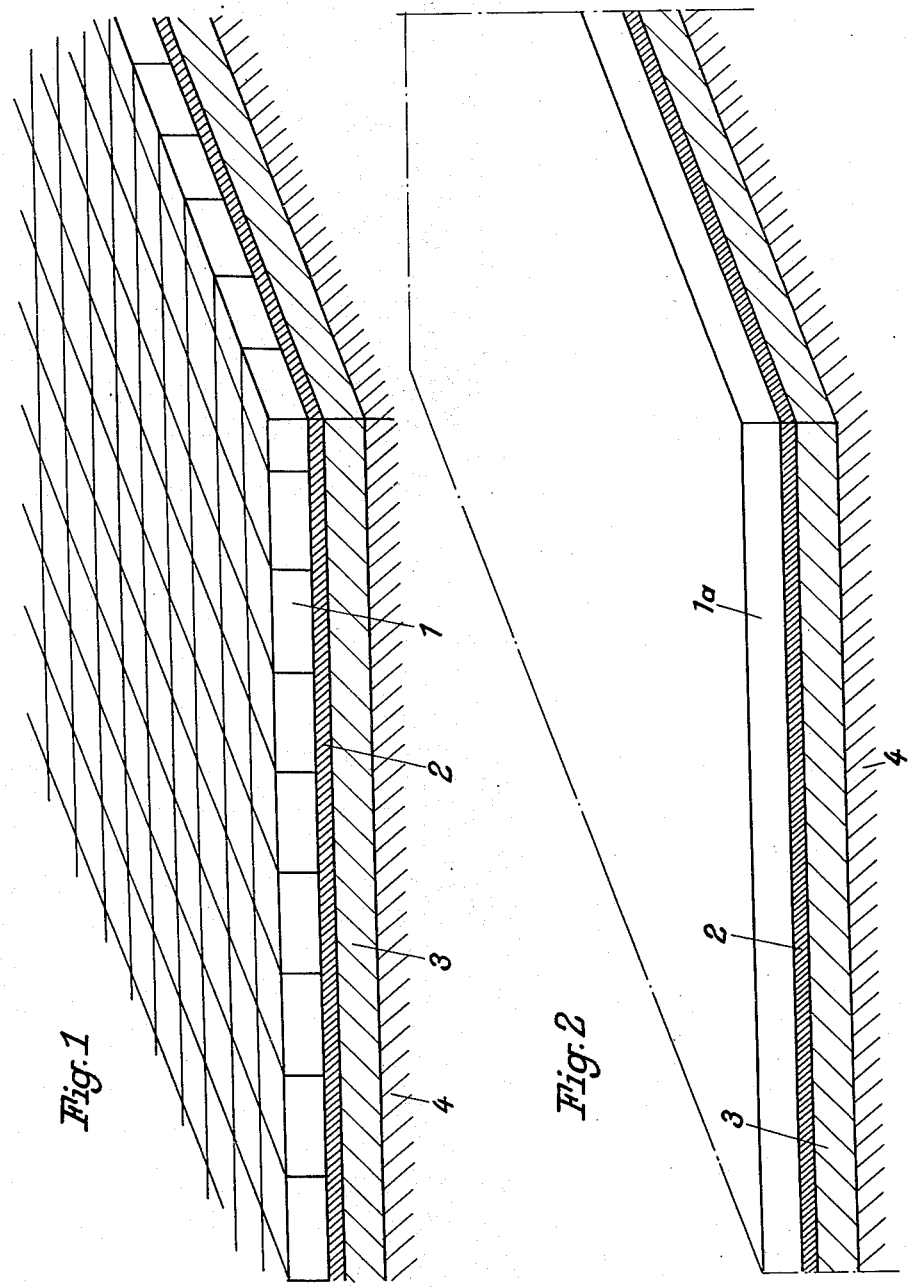

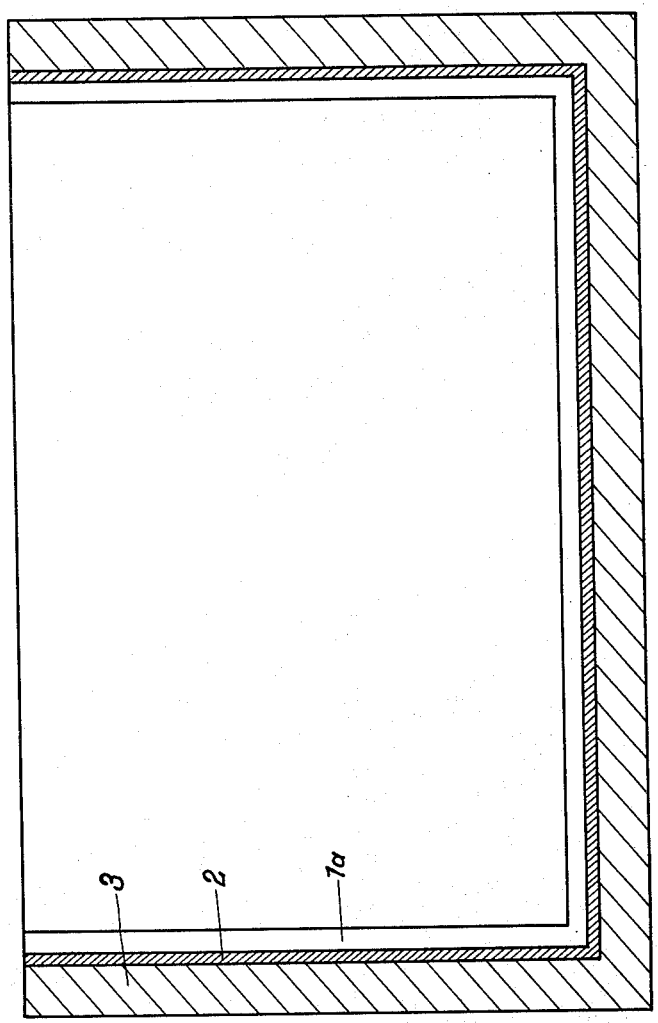

STRATIFORM STRUCTURE IMPERVIOUS TO LIQUIDS

Filed March 16, 1938     4 Sheets-Sheet 4

Inventor:

Patented Aug. 8, 1939

2,168,949

UNITED STATES PATENT OFFICE 2,168,949

STRATIFORM STRUCTURE IMPERVIOUS TO LIQUIDS

Eugen Bentz, Koblenz, and Johannes Jaenicke, Frankfort-on-the-Main, Germany, assignors to Gewerkschaft Keramchemie-Berggarten, Siershahn, Westerwald, Germany, a corporation of Germany, and Metallgesellschaft Aktiengesellschaft, Frankfort-on-the-Main, Germany Application March 16, 1938, Serial No. 196,290
In Germany March 16, 1937

4 Claims. (Cl. 72—14)

This invention relates to structures impervious to liquids, such as containers, pipe-lines or floors, having a surface resistant to mechanical and/or chemical attacks.

It is known to make tiled containers by disposing a protective layer of bitumen beneath the tiles. The production of such containers causes difficulties owing to the fact that it must be done by heating, whilst moreover, the linings cannot be used at high temperatures in consequence of the softening of the bitumen through heating. Finally, the bitumen also tends to react with saponifying substances, forming an emulsion, and this drawback was found to be very troublesome in, for example, dyeing vats which were lined with ceramic plates with the aid of bitumen.

It is likewise known to furnish containers and vessels, for example iron containers, with a rubber coating. As the adhesiveness of rubber to the supports was found to be defective, it has already been proposed to make containers with rubber surfaces by constructing them of perforated sheet metal, a hard rubber mass being used to coat the latter, and fill up the holes, on both sides. Even in this way, however, adequate adhesion of the protective coating to the support, could not be obtained. Containers have also been made from mixtures of cement and aqueous rubber dispersions. In this way containers utilizable for a number of purposes have certainly been produced, but they were a failure in cases where more stringent requirements in respect to chemical resistance had to be imposed. Attempts were therefore made to render the containers of the last-mentioned type suitable for heavy chemical duty by coating them with a layer of rubber. Such containers are also very suitable for some purposes, but they cannot be used in cases where importance has to be attached to a hard or glossy—or sometimes a light— coloured or white surface, such as is frequently of great importance, for example, when observing operations in the containers or detecting impurities.

It is also known to coat floors, which are subject to chemical attack, with mixtures of rubber and cement. Such floors are not, however, able to withstand very intense attack.

In accordance with the present invention, it is possible to make structures, such as containers, pipe-lines, floors, and the like, which possess a surface extremely resistant to mechanical and/or chemical attacks, having a high gloss, if desired, and/or being of light colour, for example white.

According to the present invention, the structures are made from a laminated structure to be described in greater detail hereinafter, or by the combination of such a structure with supports. The laminated structure consists fundamentally of a layer of a rubber-cement mixture, which is produced with the aid of a mixture of an aqueous rubber dispersion, for example rubber latex, and cement, preferably alumina cement, e. g. melted cement and which may contain the usual additions; of a layer, disposed thereabove, of rubber or a mixture high in rubber, preferably also in the form of an aqueous dispersion of rubber, for example rubber latex, or a mixture of a rubber dispersion preferably applied by spraying; and a coating, secured on the latter layer, resistant to chemical and/or mechanical influences, and if desired jointless, for example of ceramic plates, glass, artificial resin or the like.

The rubber-cement layer need not be of the same composition at all levels. When it is desired, for example, to coat rubber-less supports, for example iron containers, with the laminated structure of the invention, it is preferable, for the sake of better adhesion, to apply direct to the iron a mixture high in cement and low in rubber, and thereover a layer higher in rubber and lower in cement. If desired, it is possible to apply, one above the other, a plurality of layers with increasing rubber content and decreasing cement content.

The rubber-cement layer need not rest on a support, but may, for example, itself constitute the bottom layer of the finished structure. Thus, for example, a container consisting of a rubber-cement mixture-reinforced, if desired, superficially or internally—may first be coated with a layer of rubber or mixture high in rubber and then be provided with the covering.

It is naturally possible to coat containers and the like externally with a protective layer, for example of rubber or tiles.

The foregoing stratified construction is excellently suited, furthermore, for example, for covering floors, for example concrete floors.

The coatings of the invention afford all the advantages of lining with tiles, glass, synthetic resins, and in addition provide a thoroughly effective protection of the basic material from which the containers and the like are made.

If, for example, an iron tank be first provided according to the invention, with one or more rubber-cement layers, then with a layer of rubber alone and finally with a layer of ceramic plates, a container is produced which possesses powers of resisting chemical attacks such as hitherto could not otherwise be attained. Containers produced in this manner differ quite fundamentally from, for example, those that would be produced if either the rubber layer or the cement-containing layer were omitted. If the rubber layer were dispensed with, the chemically active liquids would pass through to the cement-containing mixture, in consequence of a lack of tightness between the ceramic plates, would decompose said mixture, and the plates would become detached. If, on the other hand the container were to be built without cement-containing intermediate layers, the adhesion of the rubber to the iron would be inadequate, and the protective coating would consequently separate from the iron layer. Only the combined use of the different layers described in the foregoing enables a product to be obtained which complies with all requirements, particularly in respect of the adhesion of the surface coating and the protection of the main structural material of the structure.

The production of the containers of the invention also affords, inter alia, the extremely important advantage that, for example in the case of containers lined with ceramic plates, the thickness of the walls can be reduced to a fraction, for example one-fourth, of the wall thickness hitherto required—an advantage which becomes very manifest, for example, when only a limited space is available for the containers, and also, in consequence of the low weight, when the containers are transported. A further advantage of the foregoing structures results from the fact that they may be constructed in situ.

Floors constructed in accordance with the invention have been found particularly valuable, in consequence of their high elasticity, in cases where floors are subject to great vibration in addition to chemical and mechanical attacks.

The invention will now be illustrated with reference to the following examples:

*Example I*

In order to produce a container by coating an iron tank with the stratiform arrangement of the invention, the procedure is as follows: the inner surface of the iron tank is coated by applying with a spatula a layer about 1-2 mm. in thickness of a rubber latex-cement mixture of the following composition:

| | Parts |
|---|---|
| Rubber latex concentrate (approximately 75%) known by the trade name of "Revertex" | 130 |
| Sulphur | 3 |
| Zinc oxide | 5 |
| Vulkacit 576 vulcanisation accelerator (product of condensation of homologous acroleins with aromatic bases) | 1 |
| 12% aqueous casein solution | 25 |
| Alumina cement (having the following composition: $Al_2O_3$, 39.96%; $Fe_2O_3$, 13.67%; $TiO_2$, 1.87%; CaO, 37.60%; $SiO_2$, 4.78%; S, 0.70%; P, 0.13%) | 155 |
| Quartz powder | 155 |

After a drying time of about 5–6 hours, a second layer about 5 mm. thick of the following composition is applied by a spatula over the above layer:

| | Parts |
|---|---|
| Revertex | 130 |
| Sulphur | 3 |
| Zinc oxide | 5 |
| Vulkacit | 1 |
| 12% aqueous casein solution | 10 |
| Activated carbon | 6 |
| Alumina cement | 15 |
| Quartz powder | 200 |

After standing for 24 to 48 hours, a layer about 0.5–1 mm. thick is sprayed on of a mixture of the following composition:

| | Parts |
|---|---|
| Revertex | 130 |
| Sulphur | 3 |
| Zinc oxide | 5 |
| Vulkacit | 1 |
| 12% aqueous casein solution | 10 |
| Activated carbon | 6 |
| Alumina cement | 9 |
| Quartz powder | 25 |
| Ground shale | 10 |

The layer is dried, for which purpose ½ to 2 hours are sufficient. Thereupon, a layer of soft rubber is sprayed on to a thickness of about 1 mm. the following mixture being used:

| | Parts |
|---|---|
| Revertex | 130 |
| 10% Betonite suspension in water | 10 |
| Zinc oxide | 3 |
| Sulphur | 1.5 |
| Vulkacit P extra N vulcanisation accelerator (zinc salt of ethylphenyldithiocarbamic acid) | 0.5 |
| Casein solution (10%) | 10 |
| Aqueous mineral oil suspension (50%) | 100 |

The stratiform arrangement is then thoroughly dried, for example for four days, the temperature being raised to about 50°, for the last eight hours, whereupon vulcanisation is carried out. The covering of ceramic tiles is then cemented on to the vulcanised layer structure by means of an artificial resin cement, for example a phenolaldehyde resin cement in known manner.

*Example II*

Another embodiment of an iron tank covered in accordance with the invention is as follows:

The internal surface of the iron tank is coated with a layer about 6 mm. thick, applied with a spatula, of a rubber-latex-cement mixture composed as follows:

| | Parts |
|---|---|
| Rubber latex concentrate (about 75% dry content) known under the trade name of Revertex | 130 |
| Sulphur | 3 |
| Zinc oxide | 5 |
| Vulkacit P extra N vulcanisation accelerator (zinc phenylethyldithiocarbamate) | 1 |
| 10% aqueous casein solution | 30 |
| Alumina cement (having the following composition: $Al_2O_3$, 46.98%; $Fe_2O_3$, 1.31%; $TiO_2$, 1.96%; CaO, 40.22%; S, 0.95%; P, 0.01%) | 160 |
| Quartz powder | 160 |

After a drying time of 6 to 8 hours a layer about 1 mm. in thickness of a mixture of the following composition is sprayed on:

| | Parts |
|---|---|
| Rubber latex concentrate (Revertex) | 130 |
| Sulphur | 3 |
| Zinc oxide | 5 |
| Vulcanisation accelerator (Vulkacit P extra N) | 1 |
| 12% aqueous casein solution | 10 |
| Activated carbon | 5 |
| Alumina cement | 15 |
| Quartz powder | 20 |
| Ground shale | 15 |

The mixture is dried for about 1 to 2 hours, whereupon a layer about 1 mm. thick of soft rubber is applied by spraying on a mixture of the same composition as the last mixture mentioned in Example I. The layers applied are then dried for five or six days. During the last eight hours the temperature is raised to about 50°. After drying the layers are vulcanised. Finally, a layer about 5 mm. thick of a mixture of an artificial resin hardening in the cold is applied with the scoop, said mixture consisting, for example, of the following components:

| | Parts |
|---|---|
| Liquid phenolformaldehyde resin | 30 |
| Fine sand | 27 |
| Quartz powder | 40 |
| Hardening accelerator, for example ethyl sulphuric acid | 3 |

The mixture comprising the last layer hardens on standing for 24 hours, forming a hard mass with a completely smooth surface, to which a gloss may be imparted in known manner, for example by polishing.

*Example III*

Floor for a surgical operating-room.

A similar succession of layers to that used in Example I is applied to a concrete floor. The vulcanisation of the rubber layer may be carried out, for example, by treatment with warm rollers. However, this after treatment may also be dispensed with if the floor is merely left to stand for 14 days, during which time the vulcanisation of the soft rubber layer takes place even at ordinary temperature.

Several embodiments of the invention are illustrated in the accompanying drawings:

Fig. 1 shows a flooring with a top layer of ceramic tiles 1, resting on a rubber layer 2, secured on a rubber-cement layer 3, which adheres to the ground 4.

Fig. 2 illustrates the flooring similar to that shown in Fig. 1, but with the difference that the ceramic plates 1 are replaced by a jointless top layer 1a.

Fig. 3 shows a container constructed in accordance with the invention. 1 is a jointless coating, consisting, for example of an artificial resin, 2 is a rubber layer, 3 a layer of a rubber-cement-mixture.

Figure 4:
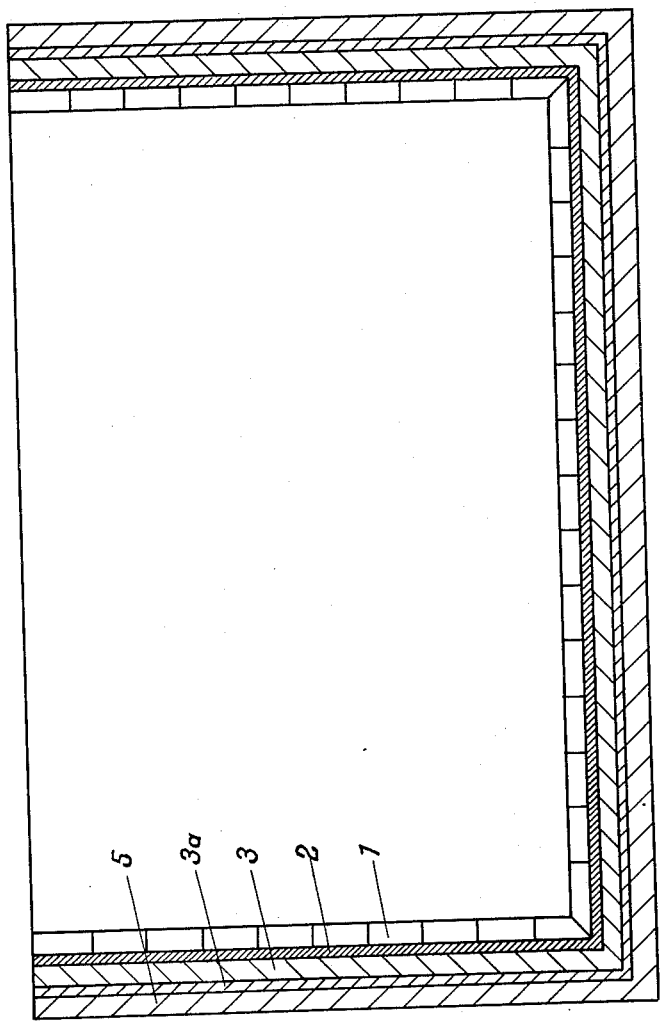

In Fig. 4 is shown an alternative form of a container. 5 is an iron frame, 3a and 3 are rubber-cement-mixtures 3, having a higher rubber content than 3a. 2 is a rubber mixture and 1 is a coating of ceramic tiles.

Figure 5:
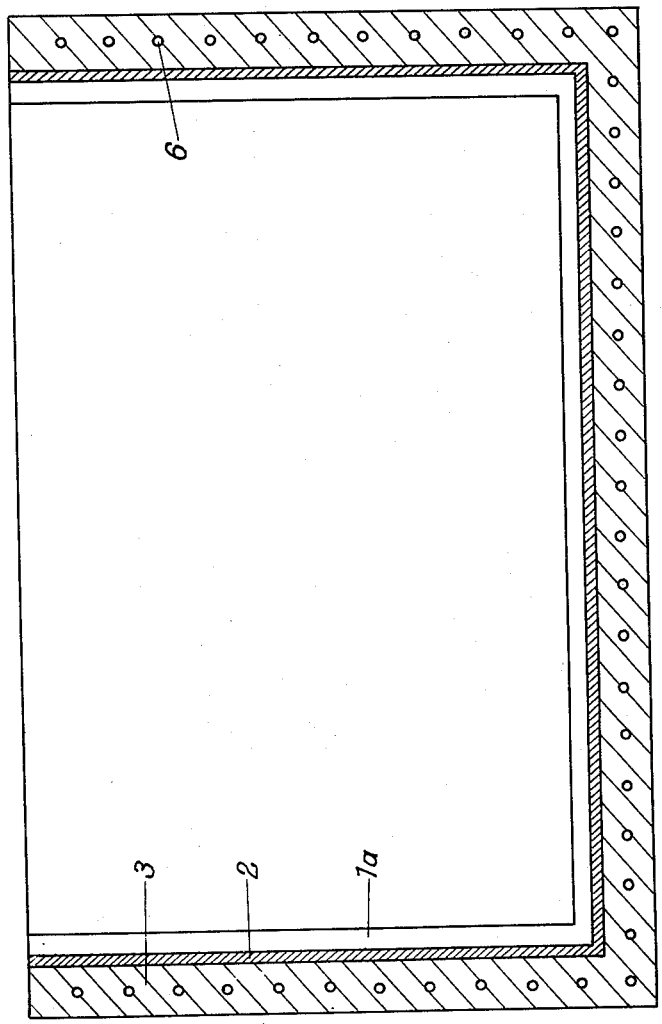

Fig. 5 shows still another form of a container constructed according to the invention. 3 is a layer of a rubber-cement mixture, this layer being supported by iron bars 6, disposed in net-like relation, 2 is a rubber layer and 1a a jointless protective layer, for example, of artificial resin.

The term "mineral cement" means true cement of the type of alumina cement, as distinguished from so-called "rubber cements" which are merely solutions of rubber.

We claim:

1. Stratiform structures, impervious to liquids, and having a resistant surface, which are constructed of a layer comprising the dry residue of a mixture of an aqueous rubber dispersion and mineral cement, a rubber layer applied thereon and a protective coating, secured on the latter layer.

2. Stratiform structures, impervious to liquids, and having a resistant surface, which are constructed of a layer comprising the dry residue of a mixture of an aqueous rubber dispersion and mineral cement, a layer applied thereon and consisting of the dry residue of aqueous rubber dispersion, and a protective coating, secured on the latter layer.

3. Stratiform structures, impervious to liquids and having a resistant surface, which are constructed of a layer comprising the dry residue of a mixture of an aqueous rubber dispersion and mineral cement, a layer of rubber applied thereon, and a coating of ceramic plates, secured on the latter layer.

4. Stratiform structures, impervious to liquids, and having a resistant surface, which are constructed of a layer comprising the dry residue of a mixture of an aqueous rubber dispersion and mineral cement, a layer of rubber applied thereon, and a proective artificial resin coating, secured on the latter layer.

EUGEN BENTZ.
JOHANNES JAENICKE.